United States Patent
Zhang et al.

(12) United States Patent (10) Patent No.: US 10,814,997 B2
(45) Date of Patent: Oct. 27, 2020

(54) SUPPORT DEVICE FOR ACTUATOR, AIR INTAKE SYSTEM AND AIRCRAFT

(71) Applicant: AIRBUS (S.A.S.), Blagnac (FR)

(72) Inventors: Feng Zhang, Beijing (CN); Na Shi, Beijing (CN); Ying An, Beijing (CN)

(73) Assignee: AIRBUS (S.A.S.), Blagnac (FR)

( * ) Notice: Subject to any disclaimer, the term of this patent is extended or adjusted under 35 U.S.C. 154(b) by 565 days.

(21) Appl. No.: 15/629,915

(22) Filed: Jun. 22, 2017

(65) Prior Publication Data

US 2018/0002029 A1 Jan. 4, 2018

(30) Foreign Application Priority Data

Jul. 1, 2016 (CN) .......................... 2016 1 0516098

(51) Int. Cl.
*B64D 33/02* (2006.01)
*B64C 1/14* (2006.01)
*B64D 29/08* (2006.01)

(52) U.S. Cl.
CPC ............ *B64D 33/02* (2013.01); *B64C 1/1446* (2013.01); *B64D 29/08* (2013.01); *B64D 2033/0213* (2013.01)

(58) Field of Classification Search
CPC ............ B64D 33/02; B64D 2033/0213; B64D 29/08; B64C 1/1446
See application file for complete search history.

(56) References Cited

U.S. PATENT DOCUMENTS

| | | | | |
|---|---|---|---|---|
| 2,798,362 A * | 7/1957 | Rainbow | ................... | F02K 1/62 |
| | | | | 239/265.29 |
| 6,293,495 B1 * | 9/2001 | Aten | ........................ | F02K 1/70 |
| | | | | 239/265.23 |
| 6,349,899 B1 * | 2/2002 | Ralston | .................. | B64D 33/02 |
| | | | | 244/53 B |
| 7,600,713 B2 * | 10/2009 | Hein | ..................... | B64D 33/12 |
| | | | | 244/53 B |
| 9,091,321 B2 * | 7/2015 | Barber | .................. | B64D 33/02 |

* cited by examiner

*Primary Examiner* — Richard R. Green
(74) *Attorney, Agent, or Firm* — Nixon & Vanderhye P.C.

(57) ABSTRACT

This disclosure relates to a support device for an actuator. The support device includes a support unit adapted to be mounted to a stationary structure, an attachment unit adapted to be attached to an actuator casing and a single pivot shaft, and the attachment unit is pivotably connected to the support unit via the single pivot shaft. The support device according to the present disclosure has a simple structure and is stable in operation. The present disclosure further relates to an air intake system for an auxiliary power unit, which includes the above support device for the actuator. In addition, the present disclosure further relates to an aircraft including the air intake system for the auxiliary power unit.

15 Claims, 7 Drawing Sheets

SUPPORT DEVICE FOR ACTUATOR, AIR INTAKE SYSTEM AND AIRCRAFT

CROSS REFERENCE TO RELATED APPLICATION

This application claims the priority of Chinese Patent Application No. 201610516098.5, entitled "SUPPORT DEVICE FOR ACTUATOR, AIR INTAKE SYSTEM AND AIRCRAFT", filed with the Chinese Patent Office on Jul. 1, 2016, which is incorporated herein by reference in its entirety.

FIELD OF THE INVENTION

This disclosure relates to a support device for an actuator, an air intake system including the support device, and an auxiliary power unit and an aircraft which include the air intake system.

BACKGROUND OF THE INVENTION

The contents in this section only provide background information relating to the present disclosure which does not necessarily constitute the prior art.

Large or medium-sized aircrafts are generally provided with an auxiliary power unit (APU), to reduce reliance on ground (airport) power supply equipment. The auxiliary power unit is an independent power unit and is primarily used to provide power and compressed air to an aircraft independently, for example, to ensure lighting and air conditioning in a passenger cabin and a cockpit.

Ambient air enters into an air intake duct of an air intake system via an air intake of the air intake system, and then flows into an inlet plenum of the auxiliary power unit. In addition to the air intake and the air intake duct, the air intake system includes a flap for opening or closing the air intake, an actuator articulated to the flap and used to move the flap, and a support device for the actuator.

A conventional support device for the actuator includes two independent support components symmetrically located at opposite sides of the actuator. The two support components are mounted at two sides of the actuator respectively by separate shafts. Thus, the shafts as well as the support components may be subjected to substantially opposite forces or torques, and long-term use may cause the axes of the shafts to deviate from each other, i.e., not coaxial with each other. In this case, the smooth rotation of the actuator about the shafts may be adversely affected.

Therefore, it is desired in this field to provide a support device for supporting an actuator which has a simple structure and is stable in operation.

SUMMARY OF THE INVENTION

An object of the present disclosure is to provide a support device for an actuator, which has a simple structure and is stable in operation.

In one aspect of the present disclosure, a support device for an actuator is provided. The support device includes a support unit adapted to be mounted to a stationary structure, an attachment unit adapted to be attached to an actuator casing, and a single pivot shaft, and the attachment unit is pivotably connected to the support unit via the single pivot shaft.

In the above support unit, since the attachment unit is pivotably connected to the support unit via the single pivot shaft, the actuator rotates only about the single pivot shaft. In this way, it may avoid the issue of instable operation caused by non-coaxial of pivot shafts in the case that two pivot shafts are employed.

Preferably, a bush or bearing is provided between the pivot shaft and at least one of the attachment unit and the support unit. By providing the bush or bearing, it may reduce abrasion to the attachment unit and/or support unit, and thus prolong the service life thereof.

Optionally, the bush or bearing may have a spherical outer surface. The spherical bush or bearing may provide multi-directional freedom to the movement of the attachment unit and/or the support unit.

In one example, the attachment unit and the actuator casing are formed into one piece. The attachment unit is at least one lug extending from the actuator casing, and the at least one lug is provided therein with a hole configured to receive the pivot shaft. The attachment unit has a simple structure.

In one example, the attachment unit and the actuator casing are separately formed. The attachment unit includes a main body portion, a lug extending from the main body portion, and a fastener configured to fasten the main body portion to the actuator casing, and the lug is provided therein with a hole configured to receive the pivot shaft. For example, the fastener is a damper, a hoop, a snap ring, a buckle, or a strap. The attachment unit has a flexible design and a wide applicability.

In one example, the attachment unit includes a first member and a second member. Each of the first member and the second member includes a main body portion, a lug extending from one end of the main body portion and a flange extending from another end of the main body, portion. The lug is provided therein with a hole configured to receive the pivot shaft, and the flange is provided therein with a hole configured to receive a bolt. After the first member is fastened to the second member by the bolt, the main body portion of the first member and the main body portion of the second member clamp or enclose a part of the actuator casing. The attachment unit is manufactured separately, without the need for making any modification to the actuator. Hence, the attachment unit may be adapted to various actuators.

Preferably, the first member and the second member are symmetrical with respect to a central axis of the part, being clamped or enclosed, of the actuator casing. The structures of the first member and the second member are symmetrical, which facilitates the manufacturing and assembling of the attachment unit.

Preferably, the support device further comprises a positioning member for positioning the attachment unit relative to the actuator housing the positioning member is one of the following: a pin for inserting in pinholes provided in the attachment unit and the actuator housing; a protrusion extending from the attachment unit and adapted to be engaged with corresponding holes in the actuator housing; a recess or hole provided in the attachment unit and adapted to be engaged with a protrusion on the actuator housing; or a step provided on the attachment unit. By providing the positioning member, the attachment unit may be accurately positioned with respect to the actuator casing.

In one example, the support unit includes a base plate and a support portion. The base plate is fixedly mounted to the stationary structure, and the support portion is arranged on one side of the base plate and includes a hole configured to receive the pivot shaft.

In one example, the support portion includes two parallel supporting plates spaced apart, and the supporting plates are arranged at two sides of a portion, connected onto the pivot shaft, of the attachment unit.

In one example, the support portion is provided at its free end with a U-shaped member or Y-shaped member. The U-shaped member or Y-shaped member has two legs each provided with a hole configured to receive the pivot shaft, so that the portion, connected onto the pivot shaft, of the attachment unit is located between the legs of the U-shaped member or Y-shaped member.

Preferably, the support unit further includes a reinforcing rib arranged between the base plate and the support portion. The structural strength of the support unit may be enhanced by the reinforcing rib. Hence, a large load can be borne.

Preferably, a stopper is arranged on the pivot shaft between the support portion and the attachment unit. The support portion and/or the attachment unit may be prevented from undesired axial movement on the pivot shaft by the stopper.

In another aspect of the present disclosure, an air intake system for an auxiliary power unit is provided. The air intake system is adapted to introduce ambient air into an inlet plenum of the auxiliary power unit. The air intake system includes a housing, an air intake duct defined by the housing, an air intake arranged in the housing, a flap configured to open or closed the air intake, an actuator configured to move the flap, and the support device for the actuator described above.

In still another aspect of the present disclosure, an aircraft including the air intake system for the auxiliary power unit described above is further provided. The air intake system is located in a tail part of the aircraft.

BRIEF DESCRIPTION OF THE DRAWINGS

Features and advantages of one or more embodiments of the present disclosure can be apparent from the following description made with reference to the drawings in which.

DETAILED DESCRIPTION

The following description of the preferred embodiments is only illustrative rather than a limitation to the present invention and application or usage thereof. Throughout the figures, the like reference signs are used to indicate the like elements and thus the construction of the like elements will not be described repeatedly.

An aircraft and an auxiliary power unit thereof will be described hereinafter with reference to FIGS. 1 and 2. The embodiments illustrated are only illustrative rather than a limitation to the scope and application of the present invention. For example, the support device for the actuator according to the present disclosure may be applied in an air intake system of an auxiliary power unit (APU) of an aircraft. The actuator is used to drive a flap of the air intake system to open or close an air intake, thereby allowing or preventing the ambient air to enter or from entering into the air intake system and thus the auxiliary power unit. In addition, the support device for the actuator according to the present disclosure may also be used in any other suitable devices, equipment, or systems. The support device according to the present disclosure may be applied to any other actuators having functions similar to those of the actuator in the air intake system of the auxiliary power unit in the aircraft.

Figure 1:
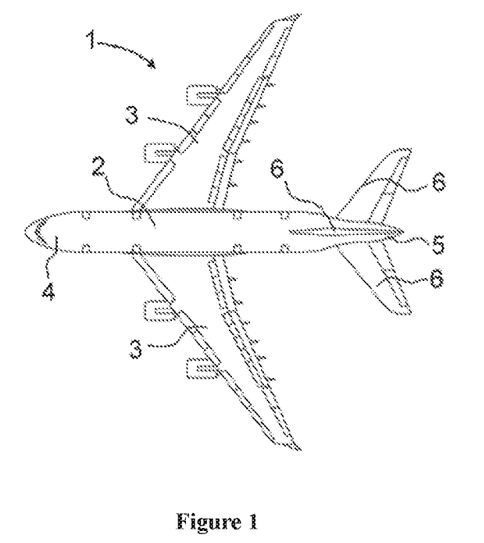
FIG. 1 is a schematic top view of an aircraft.

Reference is made to FIG. 1, which is a schematic top view of an aircraft 1. The aircraft 1 includes a fuselage 2, wings 3, a cockpit 4, a tail 5 and an empennage 6 (including horizontal tails and a vertical tail). The auxiliary power unit is generally located inside the tail 5 (for example, a tail cone).

Figure 2:
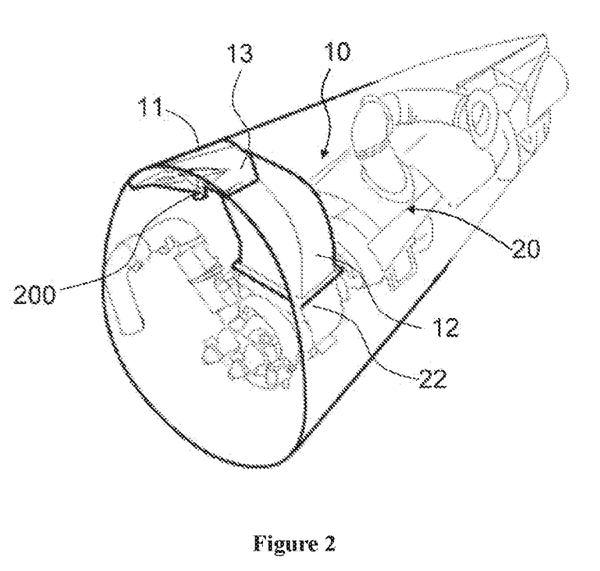
FIG. 2 is a schematic perspective view of an auxiliary power unit of an aircraft.

FIG. 2 is a schematic perspective view of an auxiliary power unit of an aircraft. As shown in FIG. 2, ambient air enters into an air intake duct 12 of an air intake system 10 via an air intake 11 of the air intake system 10, and then flows into an inlet plenum 22 of the auxiliary power unit 20. In addition to ensuring normal operation of the APU, the air in the inlet plenum 22 of the auxiliary power unit 20 is also compressed and conveyed to an air conditioning assembly in the front of the fuselage so as to ensure the operation of the air conditioning system inside the cabin. The air intake 11 of the air intake system 10 is generally arranged on a side of the tail 5 rearward of the empennage 6.

As shown in Figures, the air intake system 10 includes a housing 13, the air intake duct 12, defined by the housing 13, the air intake 11 arranged in the housing 13, a flap 16 (shown in FIG. 5) for opening or closing the air intake 11, an actuator 200 articulated to the flap and used to move the flap, and a support device 100 for the actuator 200. The air intake system 10 is adapted to introduce air entering via the air intake 11 into the inlet plenum 22 of the auxiliary power unit 20.

Figure 3:
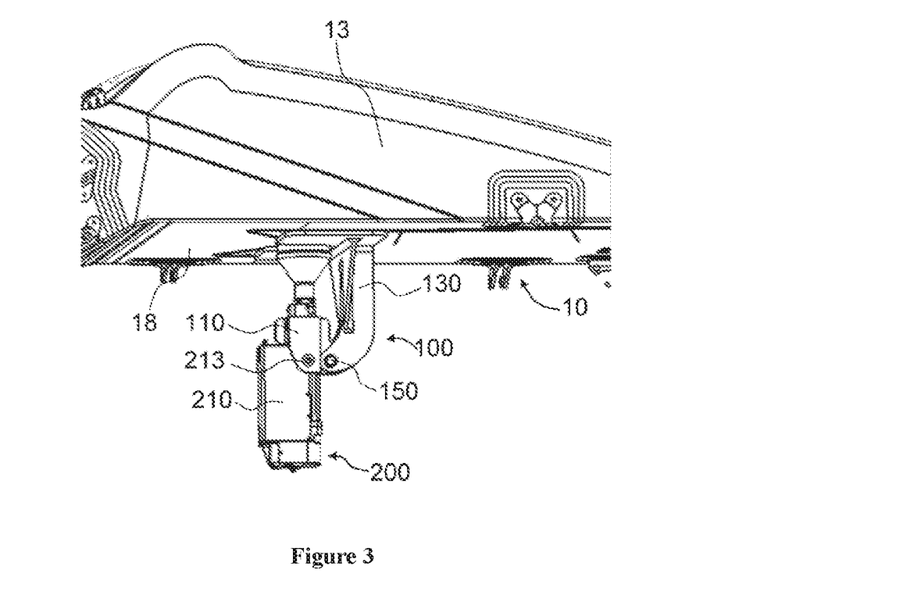
FIG. 3 is a schematic view of an air intake system according to an embodiment of the present disclosure.
Figure 4:
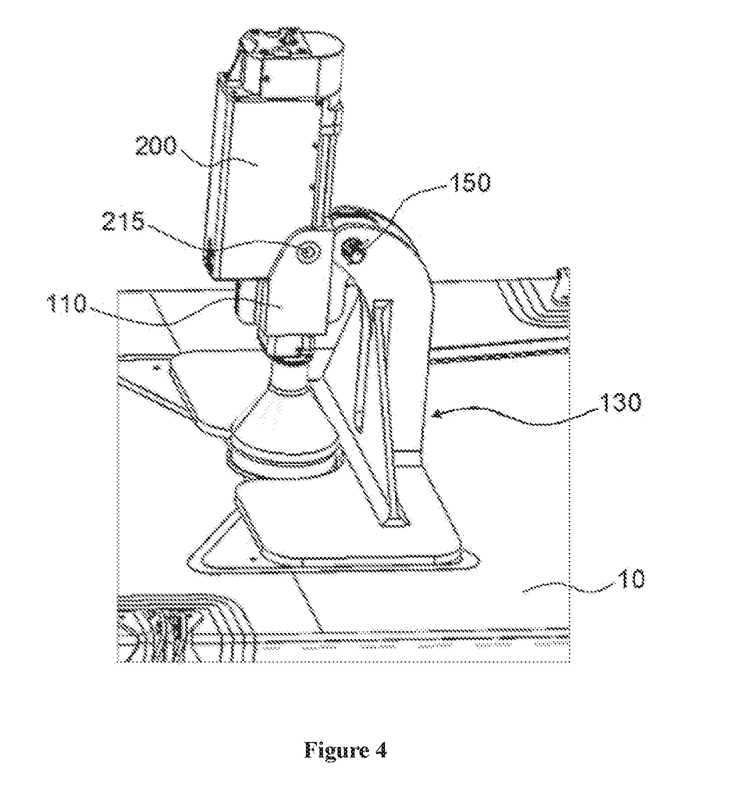
FIG. 4 is a schematic bottom perspective view of FIG. 3.

Reference is made to FIGS. 3 and 4, which are schematic perspective views of the air intake system according to an embodiment of the present disclosure viewed from different directions. As illustrated, an actuator 200 is located at a lower part of a housing 13 of an air intake system 10. The support device 100 illustrated is fixedly mounted to a bottom plate 18 (a stationary structure) of the housing 13 of the air intake system 10 and is connected to an actuator casing 210 to support the actuator 200.

Figure 5:
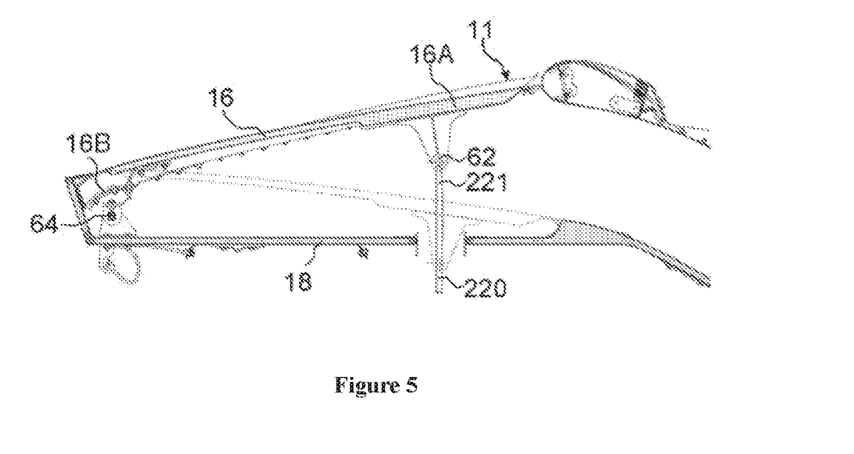
FIG. 5 is a schematic view showing the opening and closing of an air intake of an air intake system.

The actuator 200 may include an actuator casing 210 and an actuator rod 220 (as shown in FIG. 5). The support device 100 according to the present disclosure may include a support unit 130 fixedly mounted to the bottom plate 18 of the air intake system 10, an attachment unit 110 attached to the actuator casing 210, and a single pivot shaft 150 by which the attachment unit 110 is pivotably connected to the support unit 130. The actuator 200 may be rotatable about the pivot shaft 150 within a range of a certain angle (e.g., about 10 degrees), to accommodate the variations of the magnitude and direction of the actuating force during actuation.

Referring to FIG. 5, it is a schematic view showing that an actuator drives a flap to open and close an air intake. In FIG. 5, the solid line indicates that a flap 16 (or referred to as a trap door, a driven member) is in a position of closing an air intake 11, and the dotted line indicates that the flap 16 is in a position of opening the air intake 11. The flap 16 has a first end 16A articulated to an end (a free end) 221 of an actuator rod 220 of the actuator 200 via a first articulated shaft 62, and a second end 16B articulated to the housing of the air intake system 10 via a second articulated shaft 64. An actuator rod 220 of the actuator 200 protrudes upward out of the actuator casing (not shown in FIG. 5) and passes through the bottom plate 18 of the housing of the air intake system 10 and into the air intake system 10 and is articulated to the flap 16 for opening and closing the air intake 11. The actuator 200 is configured to allow the actuator rod. 220 to move upward or downward relative to the actuator casing 210 so as to drive the flap 16 to close or open the air intake 11. In this way, when the actuator rod 220 moves downward or upward, the first end 164 of the flap 16 rotates about the second end 16B, thereby opening or closing the air intake 11. In the example illustrated, a downward movement of the actuator rod 220 can open the air intake 11 (as indicated by the dotted line), while an upward movement of the actuator rod 220 can close the air intake 11 (as indicated by the solid line).

Since the actuator rod 20 is articulated to the flap 16, during opening or closing the air intake, the actuator rod 220 may sway by a certain angle. For example, the actuator rod 220 sways leftward or rightward in FIG. 5. Therefore, the support device 100 according to the present disclosure is configured to allow the actuator 200 to rotate about the pivot shaft 150.

Figure 6:
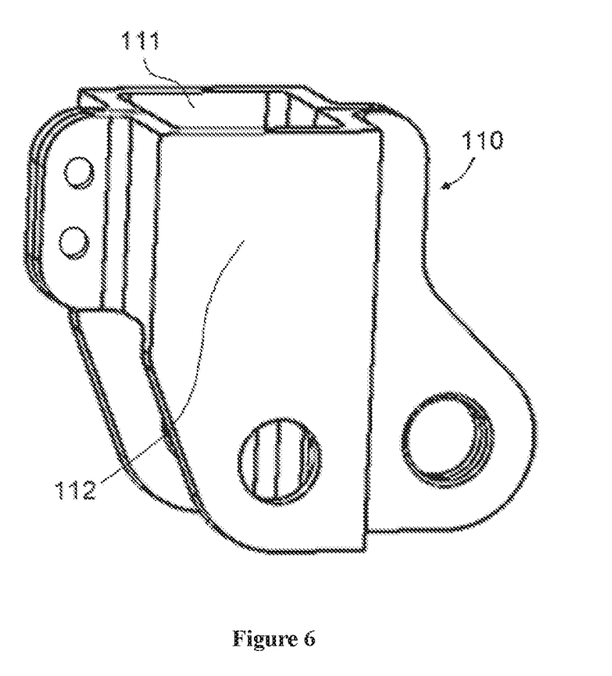
FIG. 6 is a schematic perspective view of an attachment unit of a support device for an actuator according to an embodiment of the present disclosure.
Figure 7:
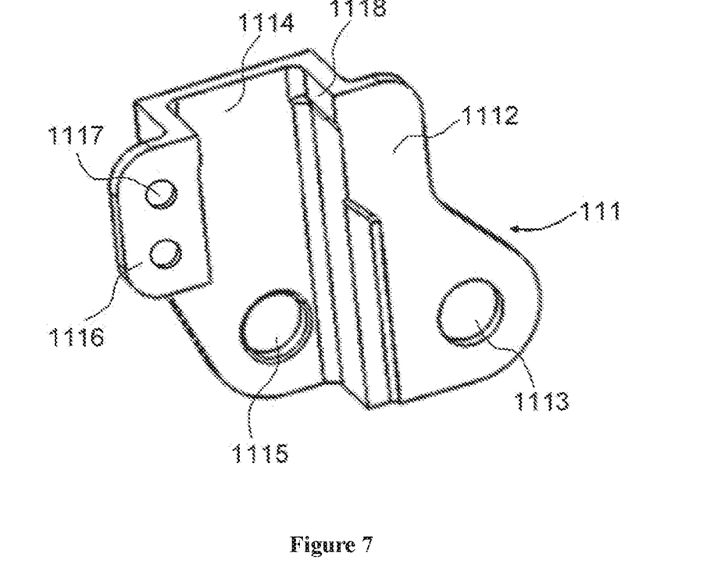
FIG. 7 is a schematic perspective view of a first member of the attachment unit in FIG. 6.
Figure 8:
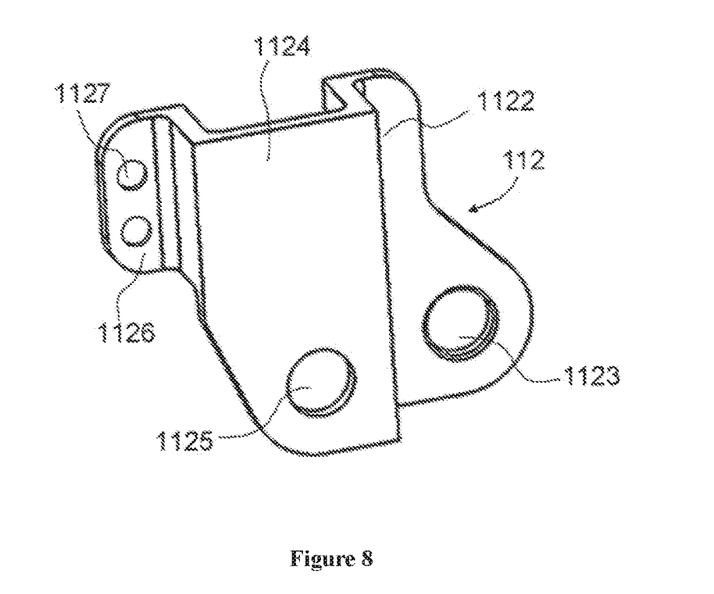
FIG. 8 is a schematic perspective view of a second member of the attachment unit in FIG. 6.

FIGS. 6 to 8 show schematic views of the attachment unit 110 of a support device 100 according to an embodiment of the present disclosure. As illustrated, the attachment unit 110 includes a first member 111 and a second member 112. The first member 111 may include a main body portion 1114, a lug 1112 and a flange 1116. The main body portion 1114 is configured to be attached to the actuator casing. The inner surface of the main body portion 1114 may be shaped according to an outer profile of the actuator casing. The lug 1112 is configured to be pivotably connected to the pivot shaft 150. The flange 1116 is configured to facilitate use of a fastener to fasten the main body portion 1114 to the actuator casing. In the example illustrated, the main body portion 1114 may be in a substantially U-shape. The lug 1112 extends substantially perpendicularly from an end of the main body portion 1114, and the flange 1116 extends substantially perpendicularly from the other end of the main body portion 1114. In this way, the lug 1112 and the flange 1116 may be substantially in parallel with each other, or may be located in the same plane. The lug 1112 is provided therein with a hole 1113 configured to receive the pivot shaft 150. In certain embodiments, the first member 111 may further be provided with a positioning member configured to position the first member 111 in a desired position. For example, in the example illustrated, the main body portion 1114 of the first member 111 is provided therein with a positioning hole 1115. The actuator casing 210 may be provided thereon with a protrusion 215 (as shown in FIG. 4) configured to be engaged with the positioning hole 1115 so as to position the first member 111 relative to the actuator casing 210. It will be appreciated that, the positioning member on the first member 111 may be in the form of a recess configured to be engaged with the protrusion 215. In some embodiments, the positioning member on the first member 111 may be in the form of a protrusion, and the positioning member on the actuator casing 210 may be in the form of a hole or a recess configured to be engaged with the protrusion. In some embodiments, the positioning member may include a pin formed separately from the attachment unit. The pin may be configured to be inserted in pinholes provided in the attachment unit and the actuator casing. In some embodiments, the positioning member may be a step provided on the attachment unit. The step may be engaged with corresponding structure of the actuator casing. In addition, the positioning member may be in any other appropriate form capable of achieving the above-mentioned positioning function. It will be appreciated that the positioning member may be integrally formed with the attachment unit by, for example, welding, or may be formed separately. In certain embodiments, the flange 1116 may be provided therein with a hole 1117 configured to receive a bolt.

Similarly, as shown in FIG. 8, the second member 112 may include a main body portion 1124, a lug 1122 and a flange 1126. The main body portion 1124 is configured to be attached to the actuator casing. The inner surface of the main body portion 1124 may be shaped according to the outer profile of the actuator casing. The lug 1122 is configured to be pivotably connected to the pivot shaft 150. The flange 1126 is configured to facilitate use of a fastener to fasten the main body portion 1124 to the actuator casing. In the example illustrated, the main body portion 1124 may be in a substantially U-shape. The lug 1122 extends substantially perpendicularly from an end of the main body portion 1124, and the flange 1126 extends substantially perpendicularly from the other end of the main body portion 1124. In this way, the lug 1122 and the flange 1126 may be substantially in parallel with each other, or may be located in the same plane. The lug 1122 is provided therein with a hole 1123 configured to receive the pivot shaft 150. In certain circumstances, the second member 112 may further be provided with a positioning member configured to position the second member 112 in a desired position. For example, in the example illustrated, the main body portion 1124 of the second member 112 is provided therein with a positioning hole 1125. The actuator casing 210 may be provided thereon with a protrusion 213 (as shown in FIG. 3) configured to be engaged with the positioning hole 1125 so as to position the second member 112 relative to the actuator casing 210. It will be appreciated that, the positioning member on the second member 112 may be in the form of a recess configured to be engaged with the protrusion 213. Alternatively, the positioning member on the second member 112 may be in the form of a protrusion, and the positioning member on the actuator casing 210 may be in the form of a hole or a recess configured to be engaged with the protrusion. In certain embodiments, the flange 1126 may be provided therein with a hole 1127 configured to receive a bolt.

The hole 1113 is aligned with the hole 1123 to facilitate the insertion of the pivot shaft 150 therein. The hole 1117 may also be aligned with the hole 1127 to facilitate the insertion of the bolt (fastener) therein. After the first member 111 and the second member 112 are fixed together via the bolt, the main body portions 1114 and 1124 may form a cavity for receiving a part of the actuator casing 210. The first member 111 and the second member 112 may clamp or enclose any part of the actuator casing 210. For example, in the example illustrated, the first member 111 and the second member 112, when being assembled, may clamp or enclose an upper portion, having a small size, of the actuator casing 210.

In the case that the actuator casing is of a symmetrical structure, the structure of the first member 111 and the structure of the second member 112 (especially the shape of the inner surfaces thereof in contact with the actuator casing) may be symmetrical with respect to a central axis of the clamped or enclosed part of the actuator casing. It is to be appreciated that, the structures of the first member 111 and the second member 112 may vary according to the variation of the outer profile of the actuator casing (specifically the clamped or enclosed part thereof).

In some embodiments, to achieve good contact between the attachment unit 110 and the actuator casing, a spacer may be further provided between the attachment unit 110 and the actuator casing. As shown in FIG. 7, a spacer 1118 is provided near the lug 1112 of the first member 111 and in the form of a boss. Similarly, a spacer (not shown) may be also provided near the lug 1122 of the second member 112 and in the form of a boss. In this way, when the first and second members 111, 112 are assembled together, poor contact between the first and second members 111, 112 and the actuator casing caused by manufacturing errors or the like may be avoided. Particularly, after the attachment unit is positioned relative to the actuator unit by the positioning member, there may be a clearance between the attachment unit and the actuator casing due to manufacturing and assembling errors. In this case, it is beneficial to provide a spacer between the attachment unit and the actuator casing. Further, thanks to the presence of the spacer, other parts of the first and second members 111, 112 may not be necessary to be in contact with the actuator casing, and thus the requirement of manufacturing these parts of the first and second members 111, 112 may be lowered, for example, there is no need for these parts to have shapes exactly matching with the actuator casing. In the example as shown, the spacer 1118 is integrally formed with the attachment unit. However, it will be appreciated that the spacer may be a lining plate or a shim separately formed from the attachment unit.

In one variation of the example illustrated, the positioning members 1115 and 1125 may not be provided. For example, in the case that the actuator casing 210 has a step, the attachment unit may be positioned by having its edge abut against the step.

In another variation of the example illustrated, the flanges 1116 and 1126 may not be provided with the holes 1117 and 1127 which are configured to receive the bolt. For example, the flanges 1116 and 1126 may be fastened together by a clamping device.

In another variation of the example illustrated, the flanges 1116 and 1126 may not be provided. For example, the first member 111 and the second member 112 are fastened together by a buckle or a snap.

The above attachment unit may be used with any conventional actuators. Only the structure of the attachment unit is required to be designed according to the outer profile of the actuator casing, whereas the structure of the actuator may not be modified, thereby widening the adaptability of the support device according to the present disclosure and reducing design and manufacturing costs thereof.

Figure 11:
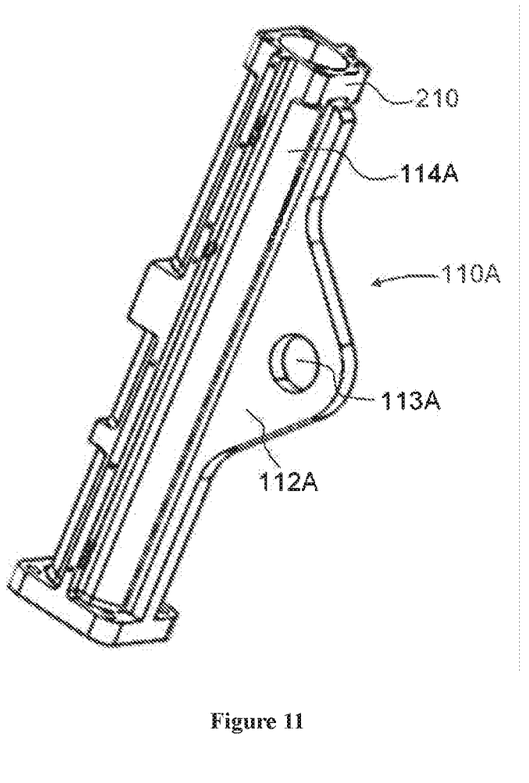
FIG. 11 is a schematic perspective view of an attachment unit according to another embodiment of the present disclosure.

Reference is made to FIG. 11, which is a schematic view of an attachment unit 110A according to another embodiment of the present disclosure. The attachment unit 110A may include a main body portion 114A and a lug 112A extending from a substantially central portion of the main body portion. The lug 112A is provided therein with a hole 113A configured to receive the pivot shaft 150. In an example, the main body portion 114A may be a part of the actuator casing 210, in other words, the main body portion 114A may be integrally formed with the actuator casing 210. In an example, the main body portion 114A may extend along a part of the longitudinal length of the actuator casing, rather than along the whole longitudinal length of the actuator casing. In an example, the number of the lug 112A may be more than one, for example, may be two. In this case, the lugs are provided herein with coaxial holes for receiving the pivot shaft. In an example, the main body portion 114A may be a member independent from the actuator casing 210, and the attachment unit may be fastened to the actuator casing 210 by a fastener such as a damper, a hoop, a snap ring, a buckle, a strap. The attachment unit has a simplified structure and its weight may be reduced significantly.

Figure 9:
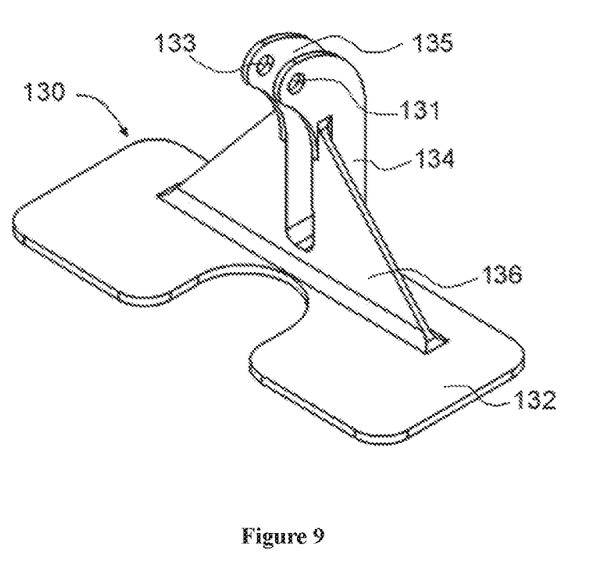
FIG. 9 is a schematic perspective view of a support unit of the support device for the actuator according to an embodiment of the present disclosure.
Figure 12:
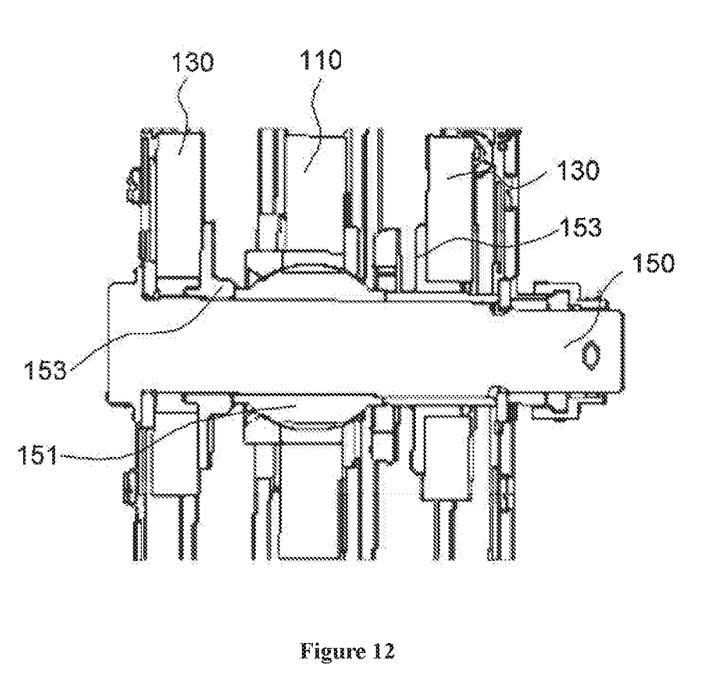
FIG. 12 is a schematic view showing the connection between the support unit and the attachment unit in the support device according to an embodiment of the present disclosure.

The support unit of a support device according to an embodiment of the present disclosure will be described in detail hereinafter with reference to FIG. 9. As shown in FIG. 9, the support unit 130 may include a base plate 132, a support portion extending from one side of the base plate 132 and a reinforcing rib 136 arranged between the base plate and the support portion. The base plate, the support portion and the reinforcing rib may be formed integrally. The base plate 132 is to be fixed to the bottom plate 18 of the air intake system 10. The base plate 132 may be in the form of a flat plate. In the example illustrated, the support portion includes two supporting plates 134 and 135 arranged in parallel with each other. The supporting plates 134 and 135 may be provided at their free ends respectively with holes 131 and 133 configured to receive the pivot shaft 150. The supporting plates 134 and 135 are spaced apart by a certain distance. As shown in FIGS. 3, 4 and 12, in the state that the attachment unit and the support unit are assembled together, the lugs of the attachment unit 110 are located between the supporting plates 134 and 135. It may be appreciated that, though the lugs of the attachment unit is sandwiched between the supporting plates in this embodiment, the lugs of the attachment unit according to the present disclosure may also be located at two sides of the supporting plates of the support unit, or the lugs and the supporting plates may be arranged alternately, as long as the pivot connection between the attachment unit and the support unit can be achieved.

Preferably, the free end, in which the holes 131 and 133 are formed, of the support portion of the support unit according to this embodiment protrudes towards one side, so that the whole support portion is formed into a substantially "L" shape. This kind of configuration leaves a room for mounting and pivoting the actuator, thereby avoiding interference between the actuator and the support device of the present disclosure.

In a modification of the above example, the reinforcing rib may be omitted, depending on specific application conditions. For example, in the case that the structure of the support portion has a strength enough to bear a load, the reinforcing rib may be omitted. Alternatively, the reinforcing rib and the support portion may be formed into one piece.

Figure 10:
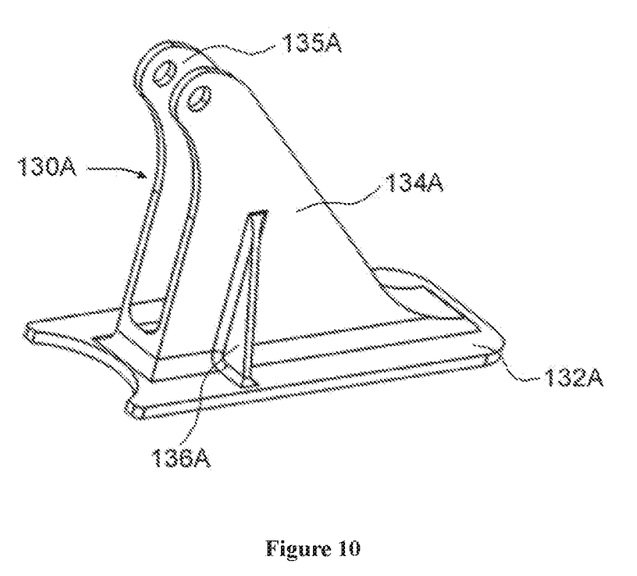
FIG. 10 is a schematic perspective view of a support unit according to another embodiment of the present disclosure.

It is to be appreciated that, the shape and/or the size of each of the base plate 132, the supporting plates 134, 135 and the reinforcing plate 136 may be determined according to a profile of its adjacent structure and/or forces applied thereto. A support unit 130A according to another embodiment of the present disclosure is shown in FIG. 10. The structure of the support unit 130A is similar to that of the support unit 130 in FIG. 9, except for the shapes and sizes of various members of the support units. As shown in FIG. 10, the support unit 130A includes a base plate 132A, two supporting plates 134A and 135A arranged in parallel with each other, and a reinforcing rib 136A arranged between the base plate and the supporting plates. The length and width of the base plate 132A in FIG. 10 are different from those of the base plate 132 in FIG. 9. The size of the rib 136A in FIG. 10 is greater than that of the rib 136 in FIG. 9. Due to the variations of the shape and size of the base plate, the shape and size of each of the supporting plates in FIG. 10 are also different from those of each of the supporting plates in FIG. 9.

The shapes or sizes of various components of the support unit may be variable according to specific requirements and application situations as long as the components of the support unit can achieve the above described functions. For example, in a variation of the support portion, the support portion may be provided at its free end with a U-shaped member or a Y-shaped member. Two legs of the U-shaped member or the Y-shaped member are respectively provided with holes configured to receive the pivot shaft 150, so that the portion (for example, the lug) of the attachment unit 110 connected onto the pivot shaft 150 may be located between the legs of the U-shaped member or the legs of the Y-shaped member.

Reference is made to FIG. 12, which schematically shows the connection between the support unit and the attachment unit according to an embodiment of the present disclosure in a sectional view. As shown in FIG. 12, the single pivot shaft 150 passes through the hole in the attachment unit 110 (specifically, the lug) and the holes in the support unit 130 (specifically, the supporting plates 134 and 135, or the legs of the U-shaped member or the Y-shaped member), thereby connecting the support unit 130 and the attachment unit 110 together. In some embodiments, the pivot shaft 150 may be arranged to be substantially in parallel with the articulated shaft 62 between the actuator rod 220 and the flap 16.

To alleviate or prevent abrasion, a bush or bearing 151 may be provided between the pivot shaft 150 and the attachment unit 110 and/or the support unit 130. In some embodiments, to enable the attachment unit 110 and thus the actuator 200 to rotate about any other axis in addition to the pivot axis, the bush or bearing 151 may have a spherical outer surface. In addition, to limit the displacement of the attachment unit 110 (specifically, the lug) and/or the support unit 130 (specifically, the supporting plates 134 and 135, or the legs of the U-shaped member or the Y-shaped member) on the pivot shaft 150, a stopper 153 may be provided on the pivot shaft 150 between the support portion of the support unit 130 and the attachment unit 110.

Compared with the conventional support device in which two independent support components are included and are pivotally connected to two sides of the actuator casing by independent shafts, the support device 100 according to the present disclosure always allow the actuator 200 to rotate about a single pivot shaft 150, thus avoiding the issue of unsmooth rotation of the actuator caused by non-coaxial pivot shafts, and thereby improving the reliability of the support device. In addition, the support device 100 according to the present disclosure only includes a support component located at one side of the actuator housing, thereby simplifying its structure, and reducing the manufacturing and assembling costs.

While various embodiments of the present invention have been described in detail herein, it should be understood that the present invention is not limited to the specific embodiments described in detail and illustrated herein, and those skilled in the art can also make other variants and modifications without departing from the principle and scope of the invention, and these variants and modifications should also be deemed to fall into the scope of the invention. Furthermore, all the elements described herein can be replaced by other technically equivalent elements.

The invention claimed is:

1. A support device for an actuator having an actuator casing, wherein, the support device comprises:
    a support unit adapted to be mounted to a stationary structure;
    an attachment unit configured to be attached to the actuator casing; and
    a single pivot shaft via which the attachment unit is pivotably connected to the support unit; and,
    wherein the attachment unit includes a first member and a second member each comprising a main body portion configured to receive the pivot shaft, and a second portion configured to enclose a part of the actuator casing.

2. The support device according to claim 1, wherein a bush or bearing is provided between the pivot shaft and at least one of the attachment unit and the support unit, or a bush or a bearing has a spherical outer surface.

3. The support device according to claim 1, wherein the attachment unit and the actuator casing are formed into one piece, the attachment unit is at least one lug extending from the actuator casing, and the at least one lug is provided therein with a hole configured to receive the pivot shaft.

4. The support device according to claim 1, wherein the attachment unit and the actuator casing are separately formed, the attachment unit comprises a main body portion, a lug extending from the main body portion, and a fastener configured to fasten the main body portion to the actuator casing, and the lug is provided therein with a hole configured to receive the pivot shaft.

5. The support device according to claim 4, wherein the fastener is a damper, a hoop, a snap ring, a buckle, or a strap.

6. The support device according to claim 1, wherein the support device further comprises a positioning member for positioning the attachment unit relative actuator housing, the positioning member is one of the following:
    a pin for inserting in pinholes provided in the attachment unit and the actuator housing;
    a protrusion extending from the attachment unit and adapted to be engaged with corresponding holes in the actuator housing;
    a recess or hole provided in the attachment unit and adapted to be engaged with a protrusion on the actuator housing; or a step provided on the attachment unit.

7. The support device according to claim 1, wherein the support unit comprises: a base plate adapted to be fixedly mounted to the stationary structure; and a support portion arranged on one side of the base plate and comprising a hole configured to receive the pivot shaft.

8. The support device according to claim 7, wherein the support portion comprises two parallel supporting plates spaced apart, and the supporting plates are arranged at two sides of a portion, connected onto the pivot shaft, of the attachment unit.

9. The support device according to claim 7, wherein the support portion is provided at its free end with a U-shaped member or Y-shaped member, the U-shaped member or Y-shaped member has two legs each provided with a hole for receiving the pivot shaft, so that the portion, connected onto the pivot shaft, of the attachment unit is located between the legs of the U-shaped member or Y-shaped member.

10. The support device according to claim 7, wherein the support unit further comprises a reinforcing rib arranged between the base plate and the support portion.

11. The support device according to claim 7, wherein a stopper is arranged on the pivot shaft between the support portion and the attachment unit.

12. An air intake system for an auxiliary power unit, wherein the air intake system is adapted to introduce ambient air into an inlet plenum of the auxiliary power unit, the air intake system comprises a housing, an air intake duct defined by the housing, an air intake arranged in the housing, a flap configured to open or closed the air intake, an actuator configured to move the flap, and the support device for the actuator according to claim 1, the support device is mounted to the housing as a stationary structure, the actuator has an actuator rod articulated to a first end of the flap, and the flap is articulated to the housing at a second end opposite to the first end, so as to allow a linear movement of the actuator rod to be converted into rotation of the flap to open or close the air intake.

13. An aircraft, comprising the air intake system for the auxiliary power unit according to claim 12, wherein the air intake system is located in a tail part of the aircraft.

14. A support device for an actuator having an actuator casing, wherein, the support device comprises:
a support unit adapted to be mounted to a stationary structure;
an attachment unit configured to be attached to the actuator casing; and
a single pivot shaft via which the attachment unit is pivotably connected to the support unit,
wherein the attachment unit comprises a first member and a second member, each of the first member and the second member comprises:
a main body portion;
a lug extending from one end of the main body portion and provided therein with a hole configured to receive the pivot shaft; and
a flange extending from another end of the main body portion and provided therein with a hole configured to receive a bolt; and
wherein after the first member is fastened to the second member by the bolt, the main body portion of the first member and the main body portion of the second member clamp or enclose a part of the actuator casing.

15. The support device according to claim 14, wherein the first member and the second member are symmetrical with respect to a central axis of the clamped or enclosed part of the actuator casing.

* * * * *